United States Patent
Handy

(10) Patent No.: US 9,248,975 B2
(45) Date of Patent: Feb. 2, 2016

(54) CLEANING APPARATUS

(71) Applicant: Keith David Handy, Stone (GB)

(72) Inventor: Keith David Handy, Stone (GB)

(*) Notice: Subject to any disclaimer, the term of this patent is extended or adjusted under 35 U.S.C. 154(b) by 0 days.

(21) Appl. No.: 14/440,222

(22) PCT Filed: Nov. 5, 2013

(86) PCT No.: PCT/GB2013/052888
§ 371 (c)(1),
(2) Date: May 1, 2015

(87) PCT Pub. No.: WO2014/072694
PCT Pub. Date: May 15, 2014

(65) Prior Publication Data
US 2015/0298915 A1   Oct. 22, 2015

(30) Foreign Application Priority Data
Nov. 12, 2012 (GB) ................................. 1220334.5

(51) Int. Cl.
*B65G 45/22* (2006.01)
*B65G 45/26* (2006.01)
*B65G 45/18* (2006.01)

(52) U.S. Cl.
CPC .............. *B65G 45/26* (2013.01); *B65G 45/18* (2013.01); *B65G 45/22* (2013.01)

(58) Field of Classification Search
CPC ...................................................... B65G 45/22
USPC ........................................ 198/493, 494, 495
See application file for complete search history.

(56) References Cited

U.S. PATENT DOCUMENTS

| 3,779,367 | A |   | 12/1973 | Hope et al. |
|---|---|---|---|---|
| 4,601,385 | A | * | 7/1986 | Sloan et al. .................. 198/495 |
| 4,960,200 | A | * | 10/1990 | Pierce ........................... 198/495 |
| 4,991,430 | A | * | 2/1991 | Kaizu ........................ 73/116.07 |
| 5,117,967 | A | * | 6/1992 | Morrow et al. ............... 198/495 |
| 5,127,416 | A | * | 7/1992 | Wakabayashi et al. .... 134/104.1 |
| 5,368,650 | A | * | 11/1994 | Tanaka et al. .................. 134/15 |
| 5,542,525 | A |   | 8/1996 | Kornely |
| 5,598,915 | A | * | 2/1997 | Malmberg et al. ........... 198/495 |
| 6,196,374 | B1 | * | 3/2001 | Kilgert et al. ................ 198/495 |
| 6,701,945 | B1 |   | 3/2004 | Budry et al. |
| 7,044,287 | B1 | * | 5/2006 | Gray ............................ 198/495 |
| 7,234,586 | B1 | * | 6/2007 | Newman ...................... 198/495 |
| 8,029,670 | B2 | * | 10/2011 | Dietenhauser et al. ....... 210/236 |

(Continued)

FOREIGN PATENT DOCUMENTS

| AU | 2003213497 A1 | 2/2004 |
|---|---|---|
| AU | 2004203577 A1 | 2/2005 |

(Continued)

OTHER PUBLICATIONS

International Search Report in corresponding PCT application Ser. No. PCT/GB2013/052888 issued (mailed) Jun. 23, 2014.

(Continued)

*Primary Examiner* — Douglas Hess
(74) *Attorney, Agent, or Firm* — Pearne & Gordon LLP

(57) ABSTRACT

Cleaning apparatus 10 for a conveyor 20. The apparatus includes a frame 12 extendable across the conveyor 20, which frame 12 removably mounts a cleaning unit 14. The cleaning unit 14 is selectively movable between a rest position clear of the conveyor 20, and an in use position engaging with the conveyor 20.

18 Claims, 14 Drawing Sheets

(56) References Cited

U.S. PATENT DOCUMENTS

| | | | |
|---|---|---|---|
| 8,291,822 B2 * | 10/2012 | Mori | 101/425 |
| 8,624,203 B2 * | 1/2014 | Tullo et al. | 250/492.1 |
| 8,727,101 B2 * | 5/2014 | Chiarini et al. | 198/497 |
| 9,032,976 B2 * | 5/2015 | Berntsen et al. | 134/61 |
| 2005/0109580 A1 | 5/2005 | Thompson | |
| 2008/0093199 A1 | 4/2008 | Reynebeau et al. | |

FOREIGN PATENT DOCUMENTS

| | | | |
|---|---|---|---|
| EP | 1164095 | A1 | 12/2001 |
| EP | 2364935 | A2 | 9/2011 |
| GB | 2082133 | A | 3/1982 |
| KR | 20110004023 | A | 1/2011 |
| SU | 955650 | A1 | 12/1982 |

OTHER PUBLICATIONS

Examination Report issued in GB1220334.5 on Oct. 8, 2014, based on which applicant is filing a PPH request.

* cited by examiner

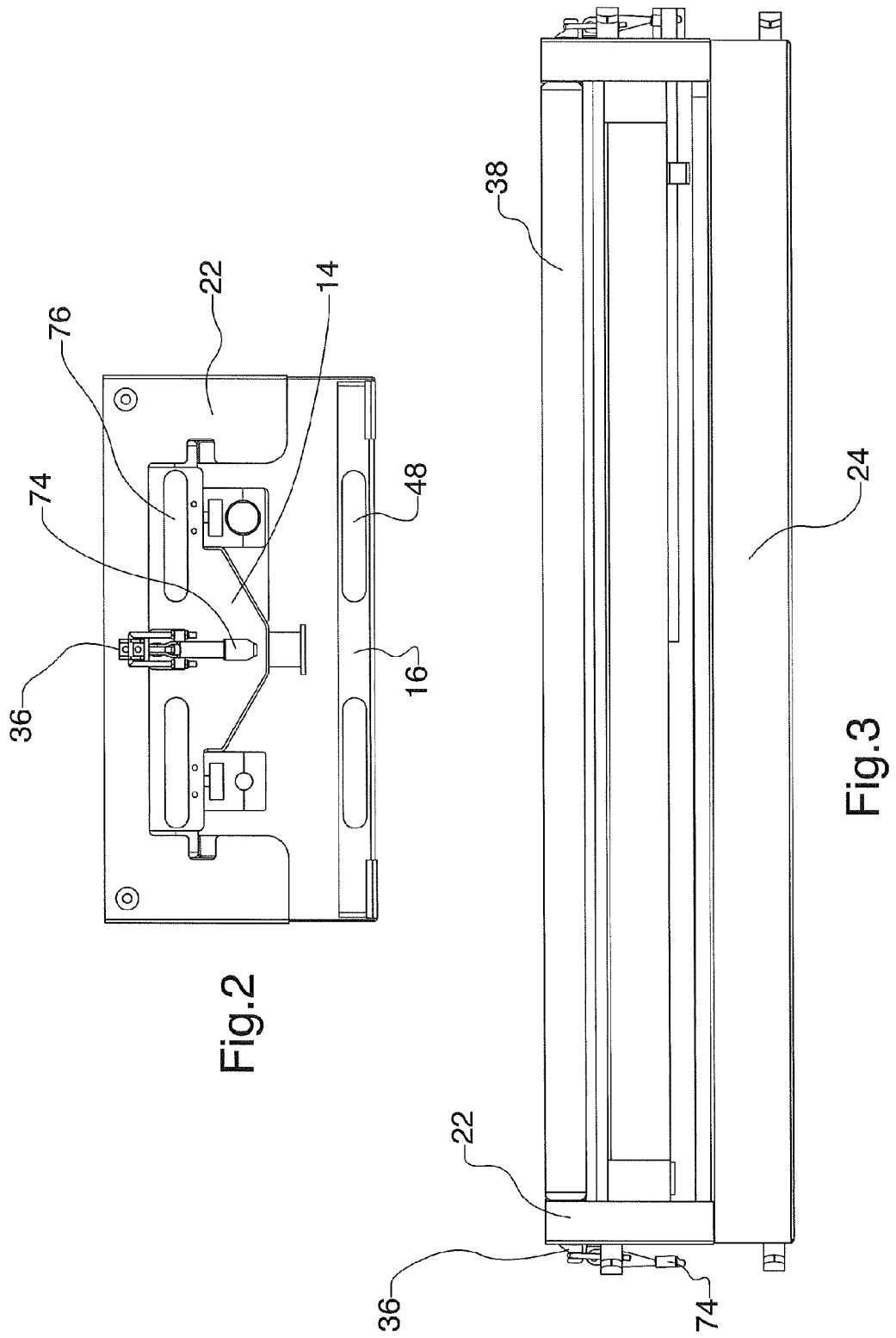

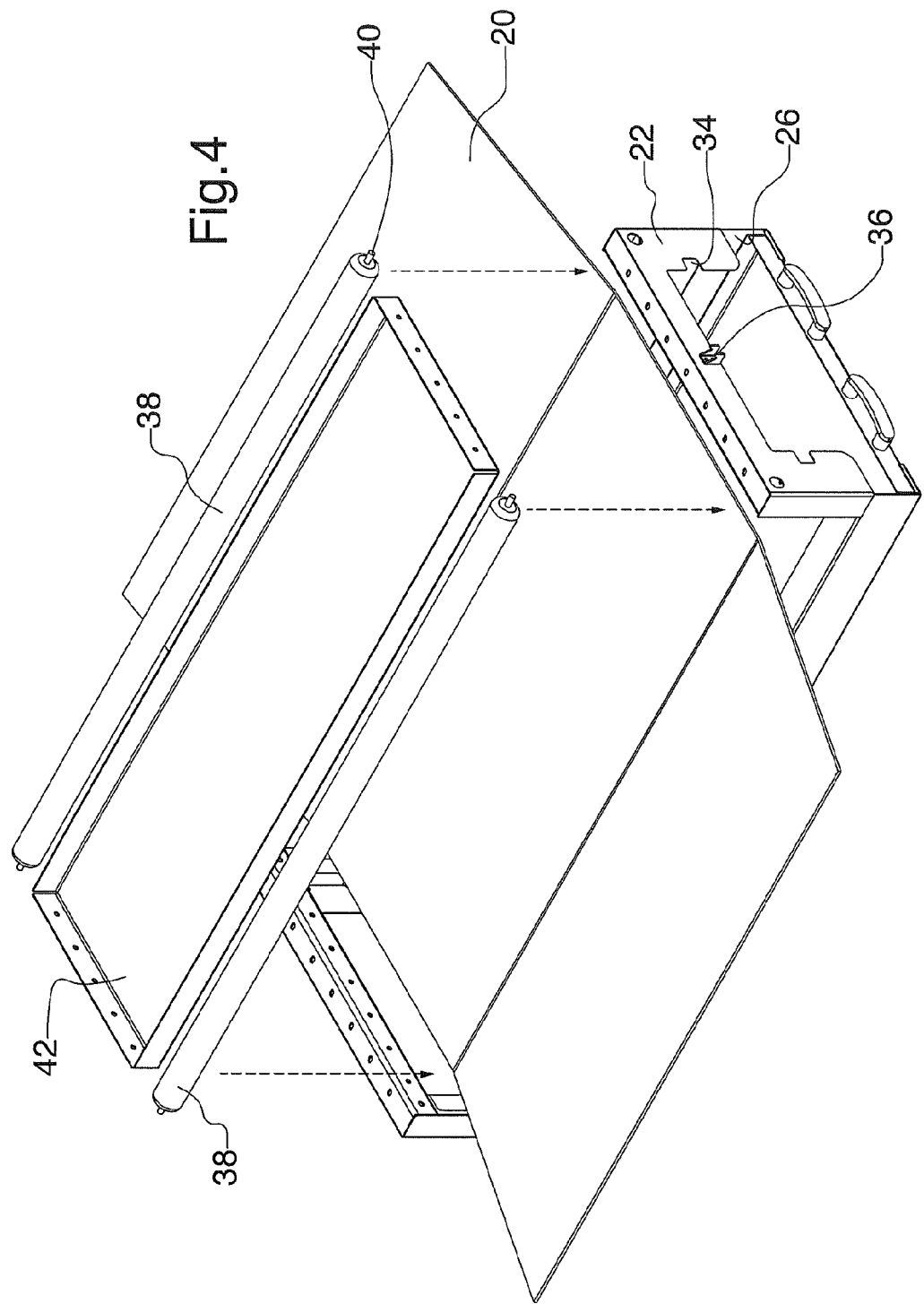

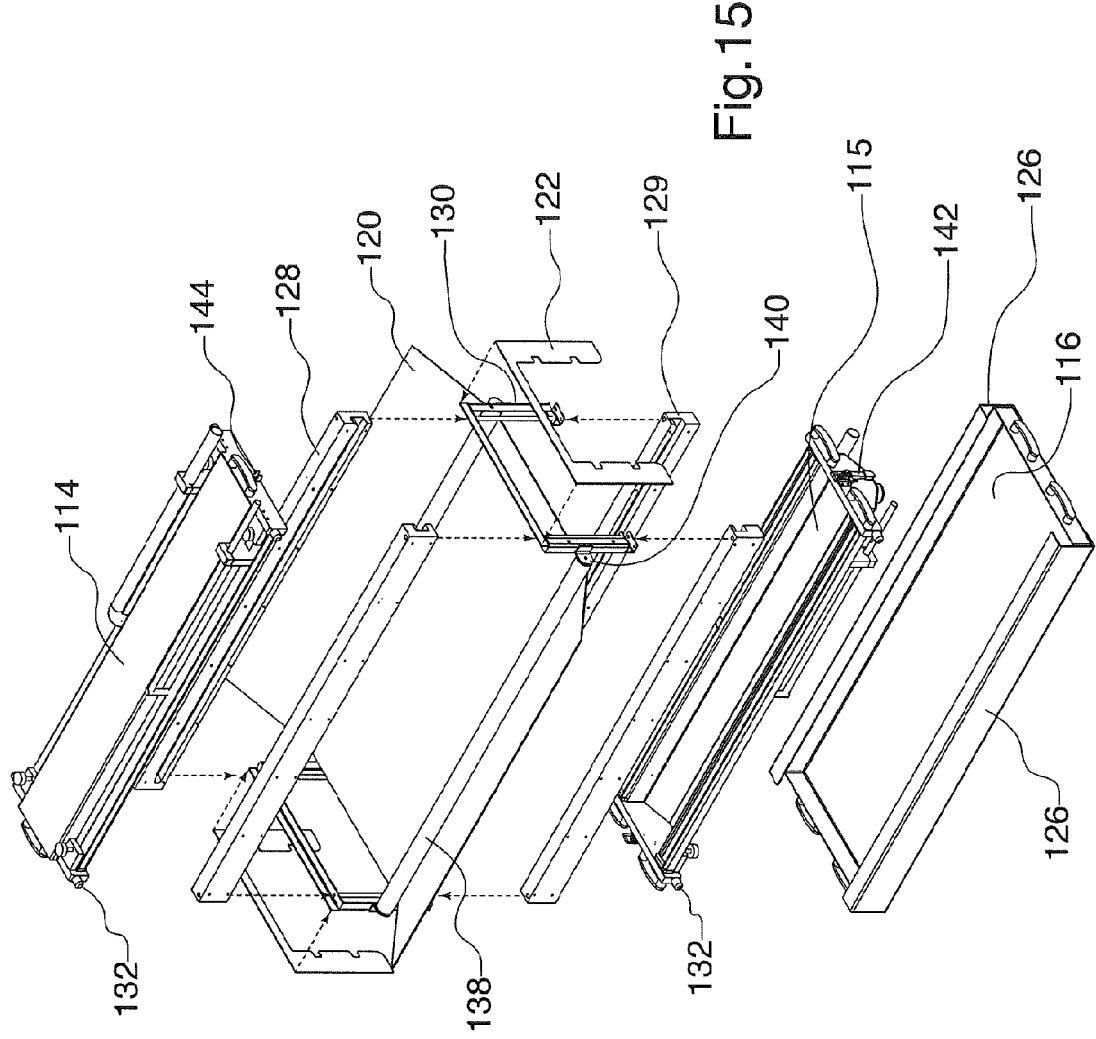

CLEANING APPARATUS

This invention concerns cleaning apparatus, and particularly but not exclusively apparatus for cleaning conveyors.

Conveyors are used in a wide range of applications including to a large extent in the food industry. Such conveyors require cleaning on a regular basis, and a number of arrangements have been proposed for use in cleaning conveyors. Such cleaning arrangements themselves also require cleaning, and particularly to avoid cross contamination in the food industry. The cleaning of such arrangements has often not proved particularly straightforward and has often led to cleaning not being carried out satisfactorily.

According to the present invention there is provided cleaning apparatus, the apparatus including a frame, which frame includes end parts each mountable in a position adjacent a respective side edge of a conveyor to be cleaned, a cleaning unit selectively locatable to extend between the end parts to clean the conveyor, the cleaning unit being selectively movable when extending between the two end parts, between a rest position clear of the conveyor, and in an in use position engaging with the conveyor.

The frame may also include a cross part extending between the end parts. The cross part may include a pair of transverse guides, with which guides side edges of the cleaning unit are slidably engageable when moving to or from a position extending between the end parts.

The transverse guides may be selectively movable relative to the end parts to move the cleaning unit between the rest and in use positions. The transverse guides may be slidably mounted to the end parts.

In one embodiment link members extendible between ends of the cleaning unit and the end parts can be used to move the cleaning unit to the in use position from the rest position. The link members may have an over centre lock, and may be in the form of toggle clips.

In an alternative embodiment actuators may be provided for moving the cleaning unit to the in use position, from the rest position and the actuators may be pneumatically or hydraulically actuated.

A lip may be provided at one end of the transverse guides, over which lip the cleaning unit is movable when moving into or out of a position extending between the end parts, and behind which lip the cleaning unit may be retained when extending between the end parts.

A collection tray may be provided selectively locatable extending between the end parts, and on an opposite side of the cleaning unit to a conveyor to be cleaned.

The cross part of the frame may include guides for the collection tray, and the collection tray may be slidably movable along the guides when moving into or out of a position extending between the end parts.

The apparatus may include an urging arrangement engageable with the conveyor to be cleaned, and on an opposite side thereof to the cleaning unit such that when the cleaning unit is in an in use position the conveyor will be urged against the cleaning unit.

The urging arrangement may be selectively extendible between the end parts, to permit a conveyor to be located extending between the urging arrangement and the cleaning unit by selectively removing the urging arrangement from extending between the end parts.

The urging arrangement may include one or more freely rotatable rollers, and may include a support member with a planar face engageable with a conveyor opposite the cleaning unit. The arrangement may include a support unit with a freely rotatable roller on either side thereof.

The cleaning unit may include front and rear edge parts relative to movement of a conveyor, engageable with the conveyor, with a body defining a chamber between the edge parts.

The rear edge part may include an inlet for receiving material cleaned off a conveyor, and the apparatus may be selectively connectable to a source of reduced pressure to connect to the inlet.

An elongate seal may be provided extending along the rear edge part behind the inlet. A second elongate seal may be provided extending along the rear edge in front of the inlet, and openings may be provided through the second elongate seal to accelerate material passing thereby towards the inlet.

The front edge part may include an outlet for a cleaning fluid to pass therethrough. The outlet or a plurality of outlets may extend across a substantial part of the length of the front edge part.

The apparatus may be selectively connectable to a source of cleaning fluid to pass out through the outlet or outlets. The cleaning fluid may include water or steam.

An elongate seal may be provided on the front edge part in front of the outlet.

The elongate seals may be flexible, and may be formed of strips of plastics material such as polyurethane or silicone.

An agitator engageable against a conveyor may be located in the chamber, and the agitator may be in the form of a brush which may be rotatable.

The apparatus may be mountable to a conveyor assembly so as to engage with the conveyor on the return path.

In a further embodiment the apparatus includes a pair of cleaning units, each engageable respectively with an opposite side of a conveyor to the other.

A respective cross part may be provided for each cleaning unit.

Link members extendable between the cleaning units to urge the cleaning units together into respective in use positions, may be provided.

The link members may have an over centre lock, and may be in the form of toggle clips.

The invention further provides a conveyor assembly including a cleaning apparatus according to any of the preceding twenty four paragraphs, the apparatus being mounted on the return path of the conveyor.

Embodiments of the present invention will now be described by way of example only, and with reference to the accompanying drawings, in which:—

FIG. 2 is an end view of the apparatus of FIG. 1;

FIG. 3 is a side view of the apparatus of FIG. 1;

FIG. 4 is a diagrammatic perspective view of part of the apparatus of FIG. 1 being installed on a conveyor;

FIG. 15 is a diagrammatic perspective exploded view of the apparatus of FIG. 11.

Figure 1:
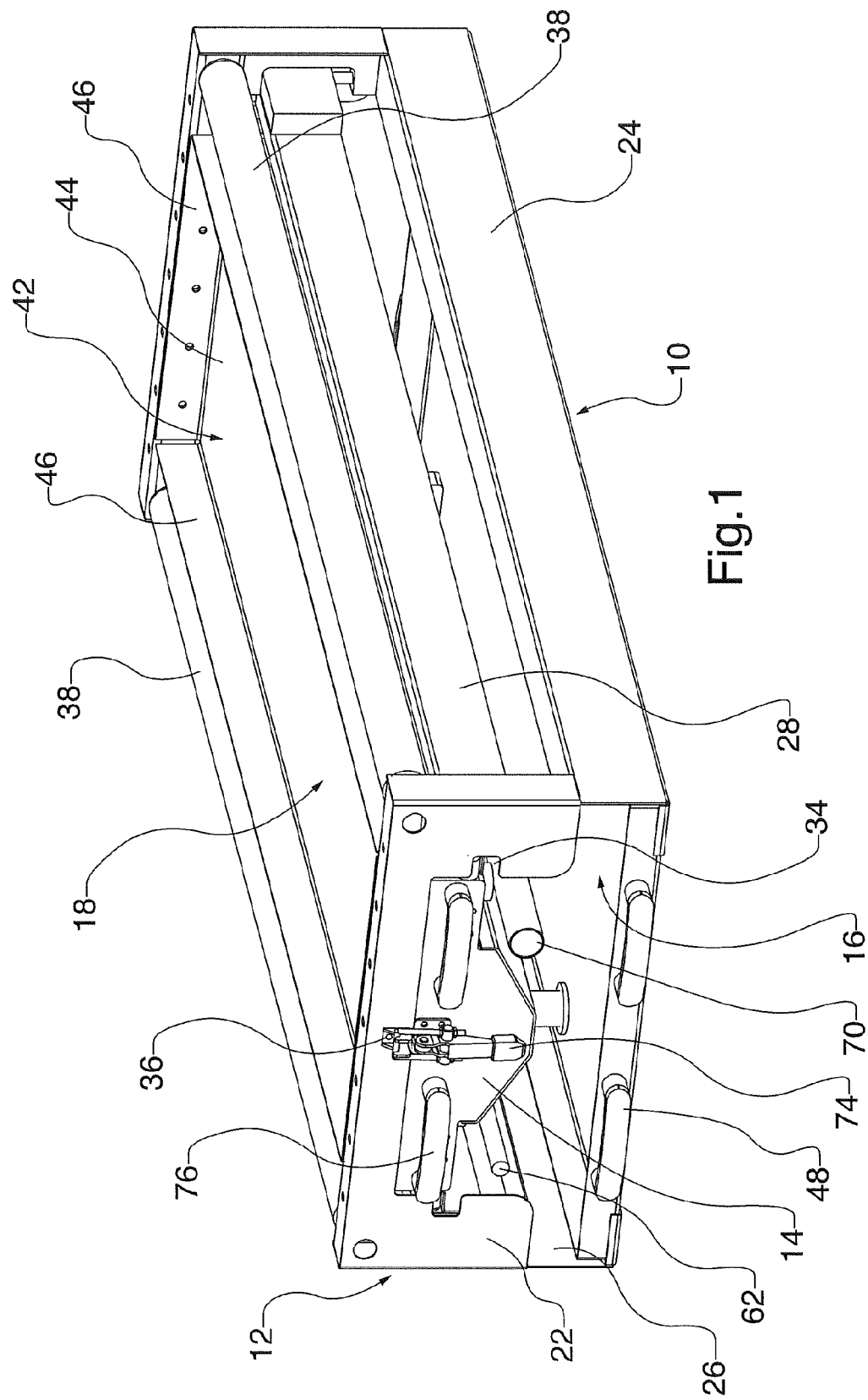
FIG. 1 is a diagrammatic perspective end view of a first cleaning apparatus according to the invention.

FIGS. 1 to 10 of the drawings show a first cleaning apparatus 10 usable to clean a conveyor such as may be used in the food industry. The apparatus 10 is mountable to a conveyor assembly to be engageable with the return path of the conveyor. The apparatus 10 has a frame 12, a cleaning unit 14, a collection tray 16 and an urging arrangement 18.

FIGS. 4-10 show apparatus 10 with a length of conveyor 20 which forms part of the return path of a conveyor. The frame 12 comprises two end parts 22 with a cross part 24 extending therebetween. The end parts 22 can be mounted to a conveyor arrangement one on either side of the conveyor 20.

The cross part 24 defines two lower inwardly facing channels 26 which can receive side edges of the collection tray 16. A pair of elongate guide members 28 are provided extending on each side between the respective end parts 22. The guide members 28 are mounted on vertical bars 30 provided as part of the end parts 22 so as to be movable vertically to a limited amount.

The guide members 28 define channels which can receive cylindrical projections 32 located towards each corner of the cleaning unit 14, such that the projections 32 are slidable along the guide members 28. Recesses 34 are provided in the front ends of the end parts 22 aligned with the guide members 28, but such that the top of the lower edge of the recesses 34 is above the lower part of the guide members 28 when in a lowermost position. A catch 36 is provided centrally on each of the end parts 22 at an upper part thereof for a purpose hereinafter to be described.

The urging arrangement 18 comprises a pair of freely rotatable idler rollers 38 each transversely extendible between upper corners of the end parts 22. Sprung pins 40 are provided in the ends of the rollers 38 to permit mounting to the end parts 22, and also release therefrom as required. Between the rollers 38 a support member 42 is provided which has a flat base 44 with upstanding side walls 46, the end pair of which can be mounted by appropriate fastening means to the end parts 22, and released as required.

FIG. 4 shows the rollers 38 and support member 42 released from the end parts 22 to permit the conveyor 20 to extend beneath the urging arrangement 18. Once the conveyor 20 is in position the rollers 38 and support member 42 will be remounted to extend between the end parts 22 as shown for instance in FIG. 5.

Figure 5:
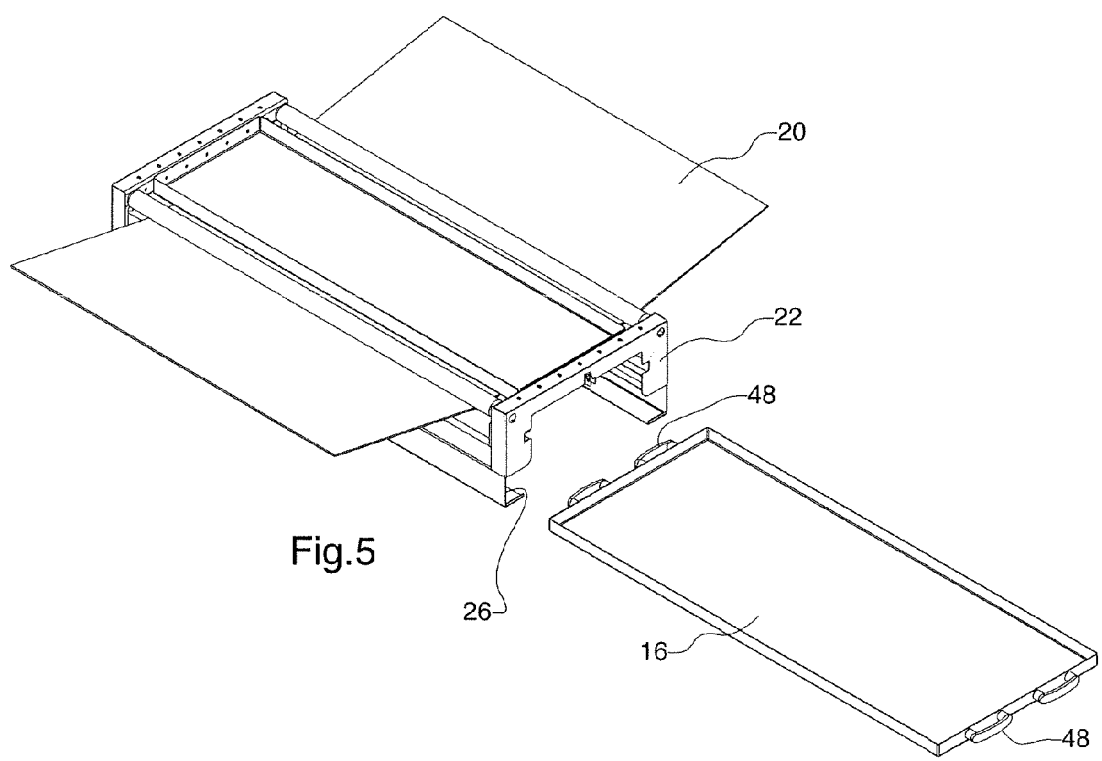
FIGS. 5-9 are similar views to FIG. 4 sequentially showing the apparatus of FIG. 1 being brought into a cleaning position.

FIG. 5 shows the collection tray 16 about to enter the channels 26. As can be seen handles 48 are provided at each of the collection tray 16 to facilitate movement thereof.

The cleaning unit 14 has a generally shallow V shape cross section with a front edge 50 relative to movement of the conveyor 20, a rear edge 52, and a chamber 54. On the outer side of the front edge 50 a sealing strip 56 made of a flexible plastics material is provided. A plurality of outlets 60 are provided adjacent the sealing strip 56 on the rear side thereof, and the outlets 60 connect via a manifold to a pipe 62 which can be connected to a cleaning fluid or a supply of steam. A quick release connector (not shown) may be provided on the end of the pipe 62.

On the rear edge 52 two sealing strips 64, 66 are provided, with the strip 64 on a front side of the rear edge 52, and the strip 66 on a rear side of the rear edge 52. The strips 64, 66 are again made of a flexible plastics material. A plurality of channels are provided through the sealing strip 64 to permit material to pass thereby, and to be accelerated as it passes thereby. An inlet 68 is provided between the sealing strips 64, 66 which inlet 68 connects to a pipe 70 which can be connected, perhaps with a quick release connection, to a source of reduced pressure, as provided by a vacuum or suction pump.

Figure 6:
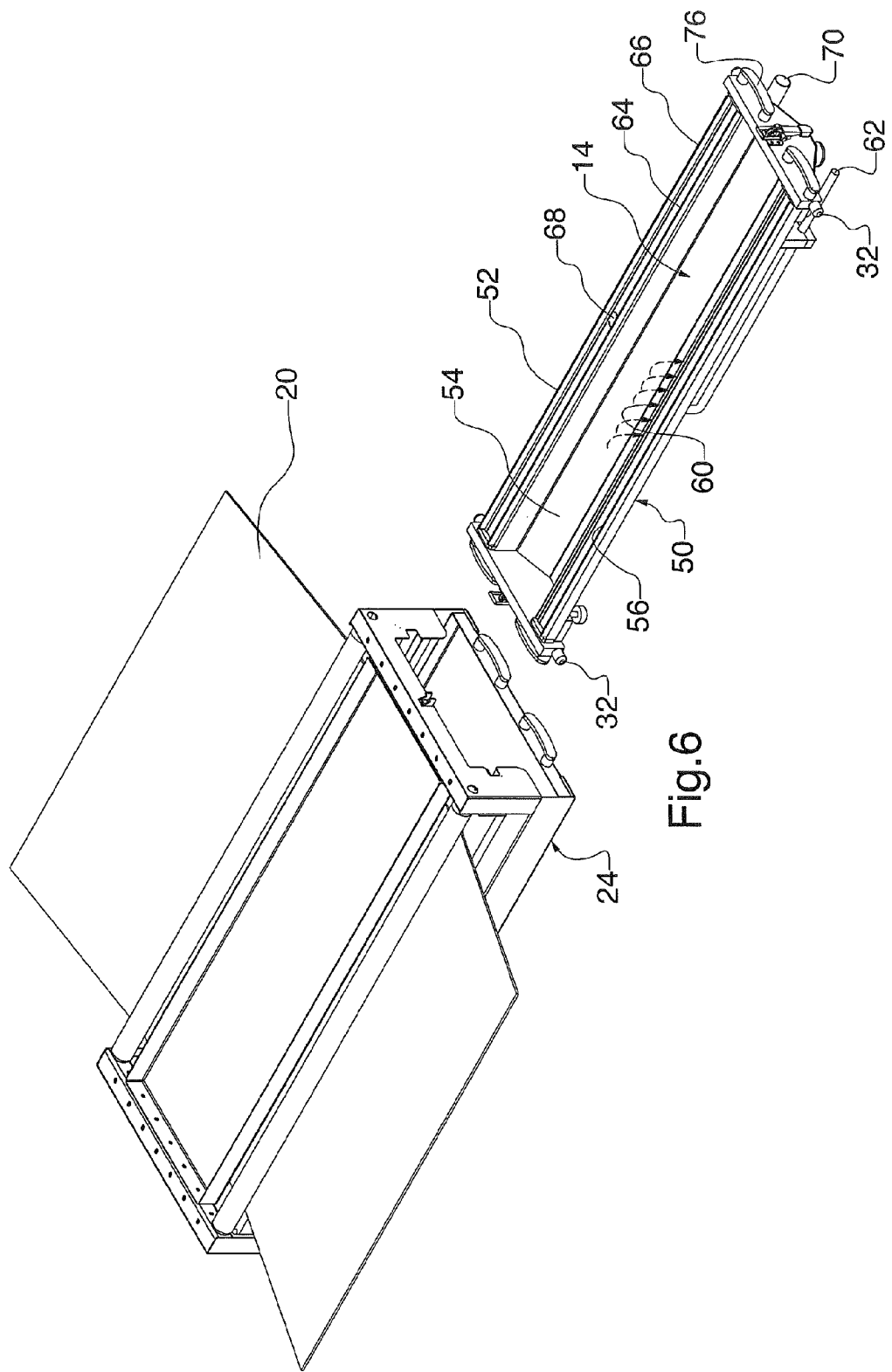
Figure 7:
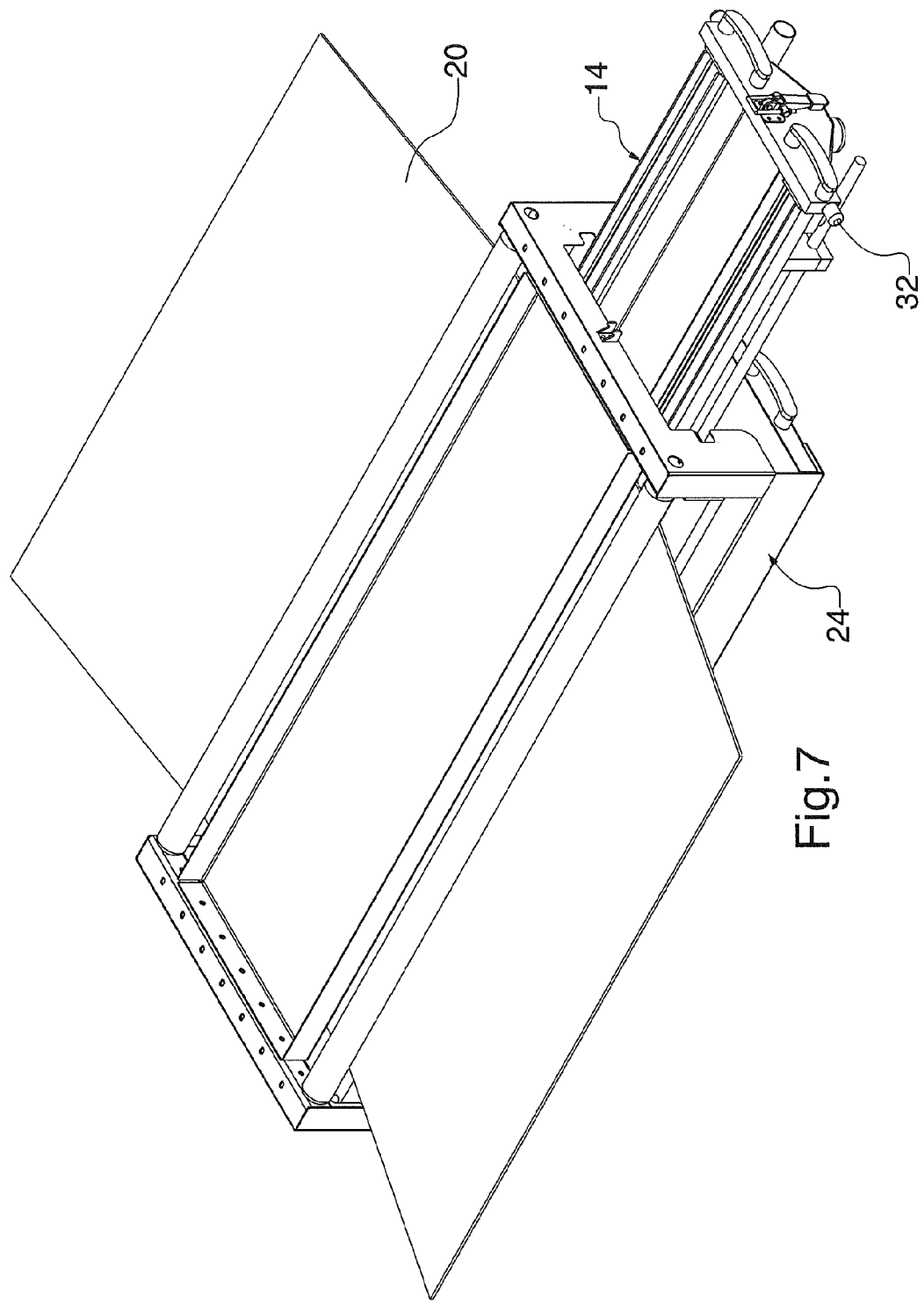

FIG. 6 shows the cleaning unit 14 clear of the frame 12. FIG. 7 shows the cleaning unit partially engaging in the frame 12, and the cylindrical projections 32 at one end will be engaging in the respective guide members 28.

Figure 8:
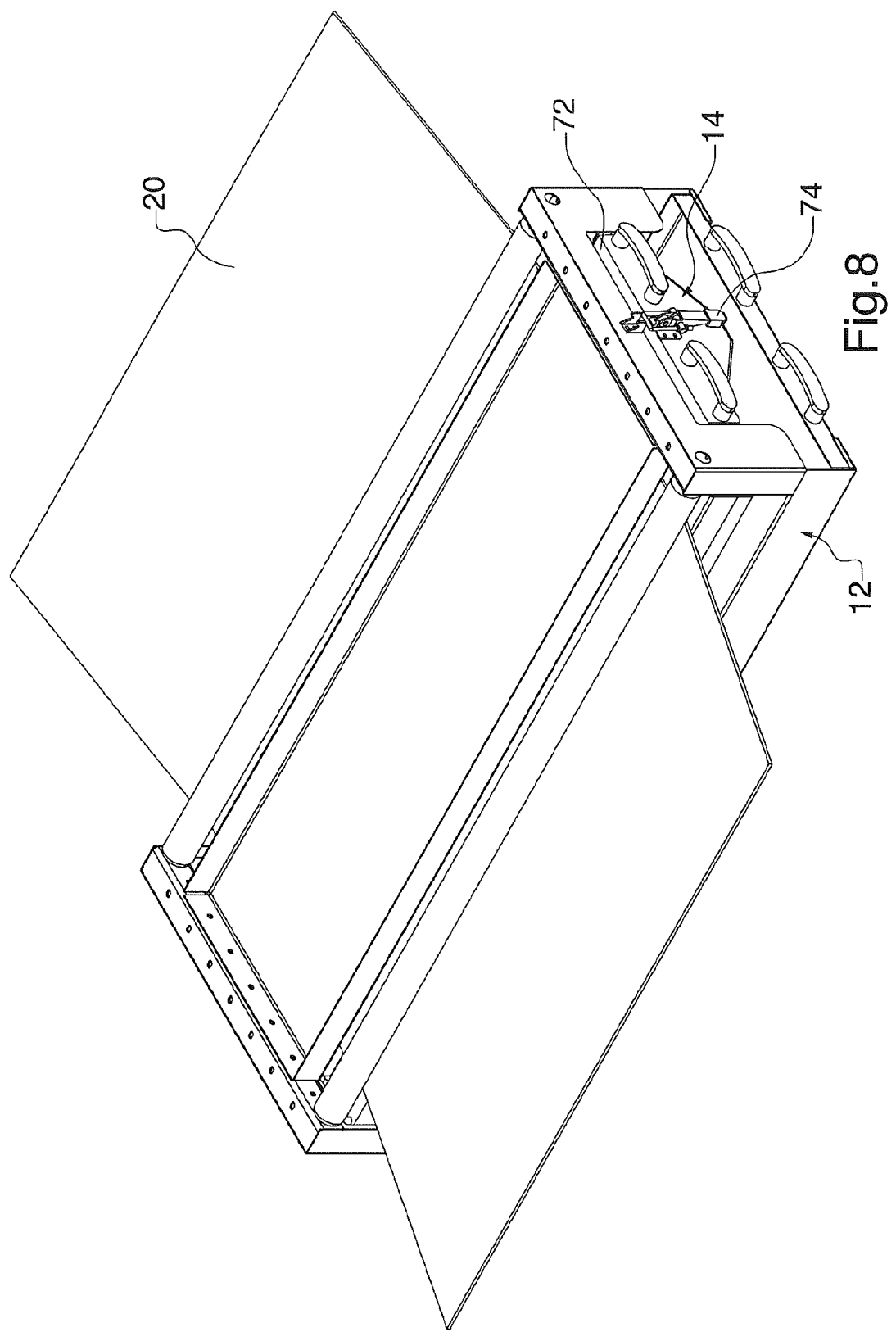

FIG. 8 shows the cleaning unit 14 fully slid into the guide members 28, and the cylindrical projections 32 will have passed through the recesses 34 and dropped below the front edge thereof. In this configuration there is a gap 72 between the top of the cleaning unit 14 and the conveyor 20. A toggle clip 74 is provided on the cleaning unit 14 at each end, and the clip 74 can engage with the respective catch 36. Use of the toggle clip 74 with its overcentre locking, will pull the cleaning unit 14 against the conveyor 20 to the position shown in FIG. 9.

Figure 9:
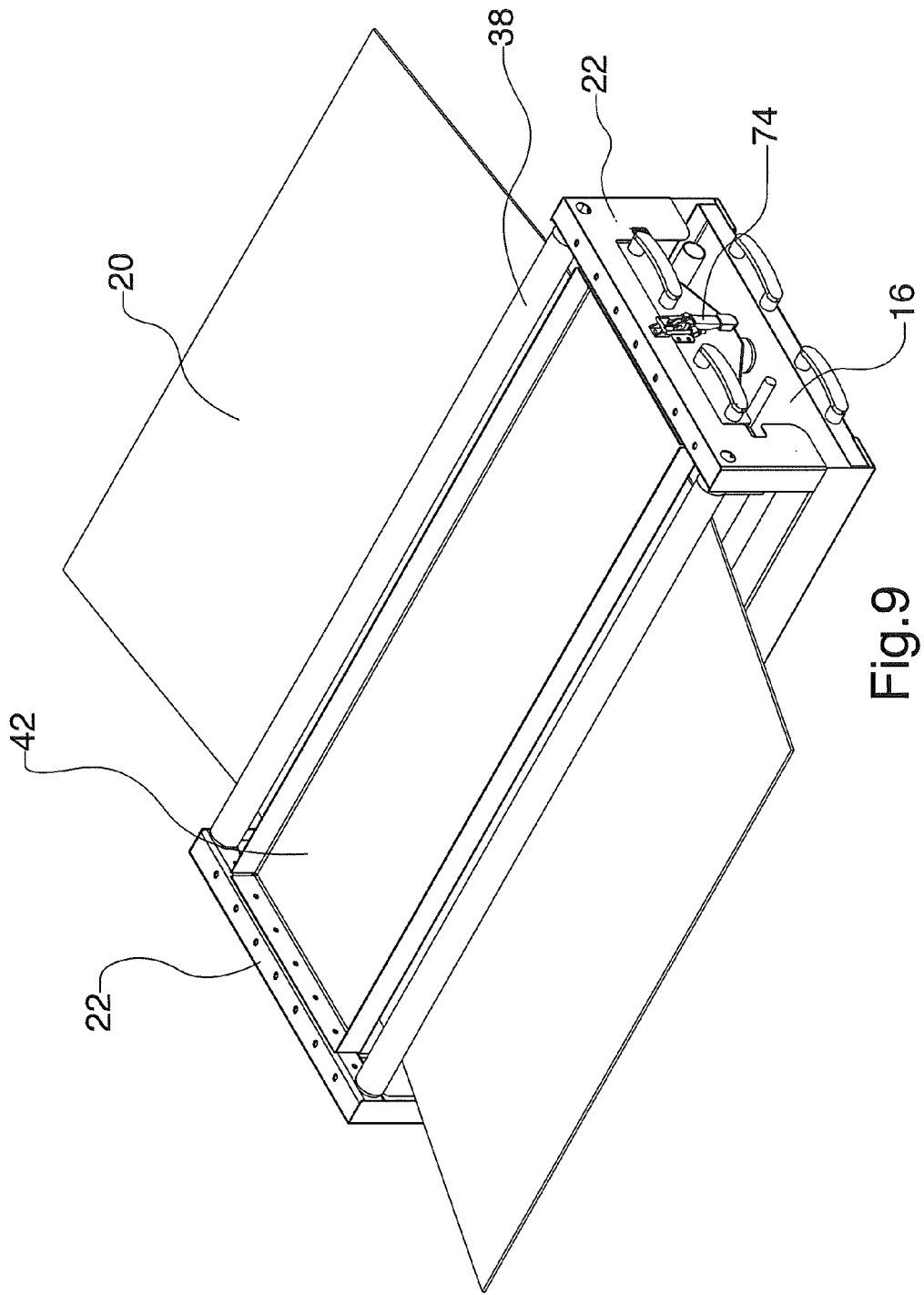
Figure 10:
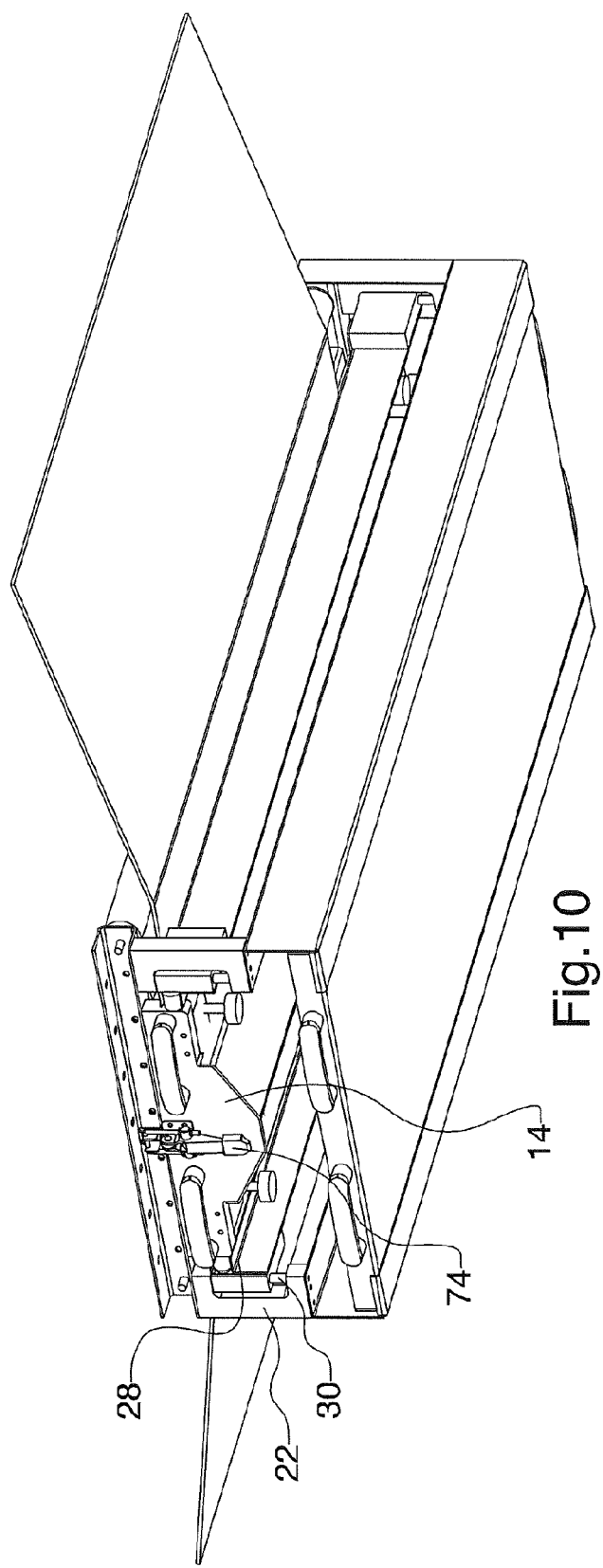
FIG. 10 is a diagrammatic part cut away perspective view of the apparatus of FIG. 1.
Figure 11:
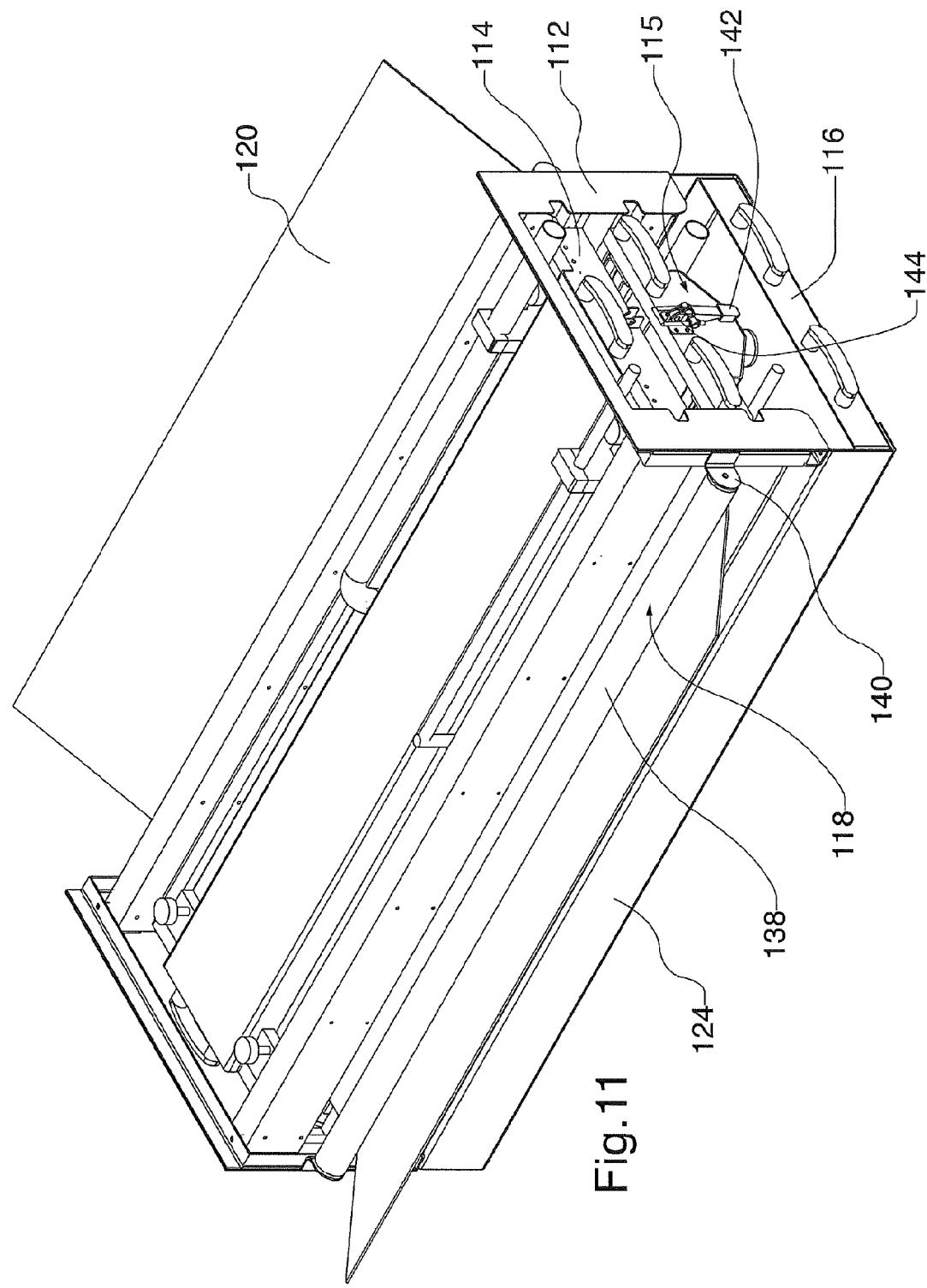
FIG. 11 is a diagrammatic perspective end view of a second cleaning apparatus according to the invention installed on a conveyor.
Figure 12:
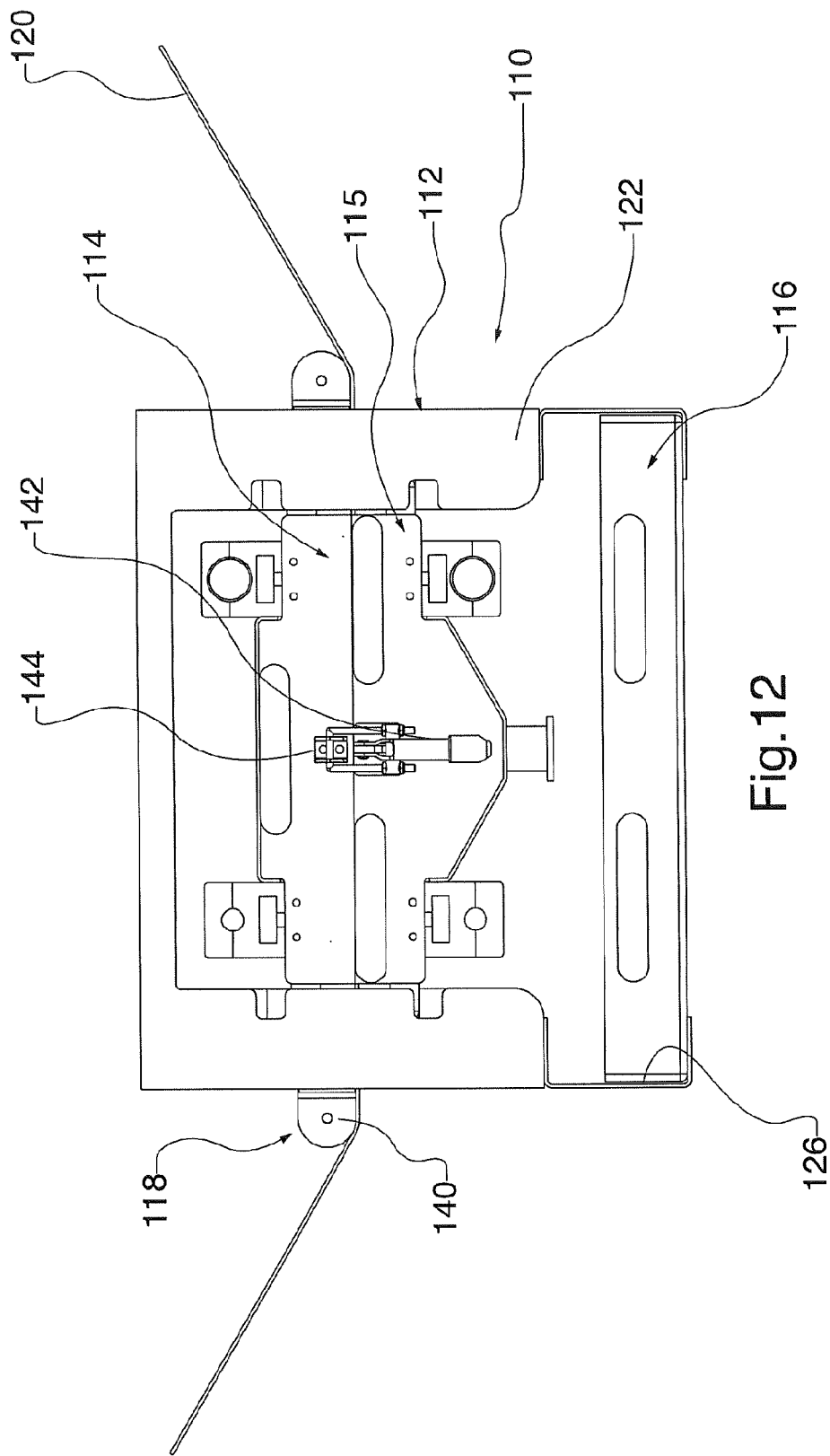
FIG. 12 is an end view of the apparatus of FIG. 11.
Figure 13:
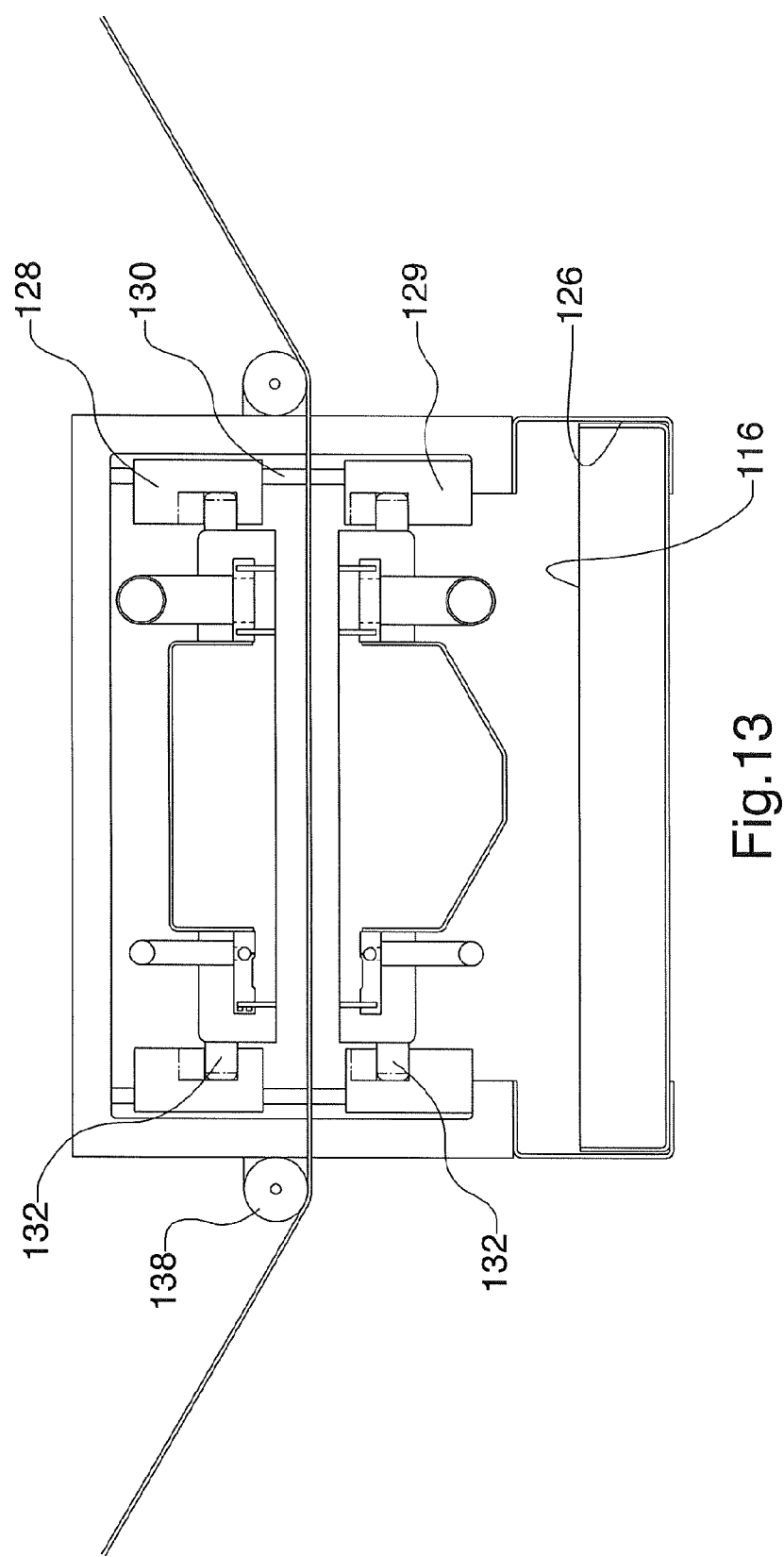
FIG. 13 is a cross sectional end view of the apparatus of FIG. 11.

In the condition shown in FIG. 9, the conveyor 20 can be cleaned by supplying steam or another cleaning fluid through the outlets 60 and against the conveyor 20 which is being urged against the cleaning unit 14 by the urging arrangement 18. The cleaning fluid and any dirt removed from the conveyor 20 will pass into the chamber 54, and through the sealing strip 64 to pass out through the inlet 68.

The outer sealing strips 56, 66 retain a reduced pressure within the chamber 54 to substantially prevent cleaning fluid and any dirt passing outwards other than through the inlet 68. Any material which is though spilt should be caught on the collection tray 16. If required the conveyor 20 can be in use during this cleaning, or the cleaning can take place once the conveyor 20 is out of use, but obviously still moving.

Once cleaning has been finished, the reduced pressure and cleaning fluid supply can be turned off. The toggle clip 74 can then be released such that the cleaning unit 14 becomes clear of the conveyor 20, and can operate in a usual manner. The cleaning unit 14 can readily be slid along and off the frame 12, and a pair of handles 76 are provided at each end to facilitate this. The cleaning unit 14 can then be taken to a cleaning station or otherwise to be thoroughly cleaned in a conventional manner. As can been seen the cleaning unit 14 should be relatively easily manually handled without the requirement for lifting equipment or similar.

There is thus described cleaning apparatus for a conveyor and particularly a food conveyor, which provides for a number of advantageous feature. The apparatus operates on the conveyor return path, meaning that if required use of the conveyor need not be interrupted. As the apparatus operates on the return path it is only necessary that the cleaning unit is clear of the conveyor when not in use, but a large clearance is not required as this part of the conveyor will not be carrying anything.

The apparatus can readily be installed on a conveyor in position so as to not affect operation of the conveyor, or require modification thereof. As can be seen the cleaning unit can readily be removed from the remainder of the apparatus, as can the collection tray, for cleaning at an appropriate and convenient location.

FIGS. 11 to 15 show a second cleaning apparatus 110 which is similar in many aspects to the apparatus 10. The apparatus 110 is usable to clean a conveyor such as may be used in the food industry. The apparatus 110 is mountable to a conveyor assembly to be engageable with the return path of the conveyor, but so as to clean both sides of the conveyor. The apparatus 110 has a frame 112 an upper cleaning unit 114, a lower cleaning unit 115, a collection tray 116 and an urging arrangement 118. The apparatus 110 is shown engageable with a length of a return path of a conveyor 120.

Again the frame 112 comprises two end parts 122 mountable to a conveyor arrangement one on either side of the conveyor 120. A cross part 124 extending between the end parts 122 defines two lower inwardly facing channels 126 which slidingly locate the collection tray 116.

An upper pair of elongate guide members 28 are provided extending between the respective end parts 122. The guide members 128 are mounted on vertical guides 130 attached to each end part 122, so that the guide members 128 are movable vertically to a limited amount.

A pair of lower guide members 129 are also provided extending between the guides 128 at a lower point to the upper elongate guide members 128. The lower guide members 129 are also movable vertically to a limited amount.

The guide members 128, 129 each define respective channels which can receive respective cylindrical projections 132 located towards each corner of each of the cleaning units 114, 115. Upper and lower recesses 134, 135 are provided in a similar manner on the front ends of the end parts 122 lined respectively with the guide members 128, 129, again such that the top of the lower edge of the recesses 134, 135 is above the lower part of the respective guide members 128, 129 when in a lowermost position.

In this instance the urging arrangement comprises a pair of freely rotatable idler rollers 138 each transversely extendible between the end parts 122 part way between the upper and lower ends of the end parts 122. Sprung pins (not shown) are provided in the ends of the rollers 138, and are engageable with outwardly extending respective brackets 140. The sprung pins permit release of the rollers 138 from the brackets 140. The upper and lower cleaning units 114, 115 of a similar configuration to the cleaning unit 14 and will not therefore be described in any further detail.

A toggle clip 142 is provided on the lower cleaning unit 115 at each end, and each toggle clip 174 is selectively engageable with a catch 176 on the upper cleaning unit 114. When the toggle clip 174 engage with the respective catches 176 the upper and lower cleaning units 114, 115 will be pulled together into a cleaning position engaging with respective sides of the conveyor 120, which conveyor 120 extends between and between the rollers 138.

Figure 14:
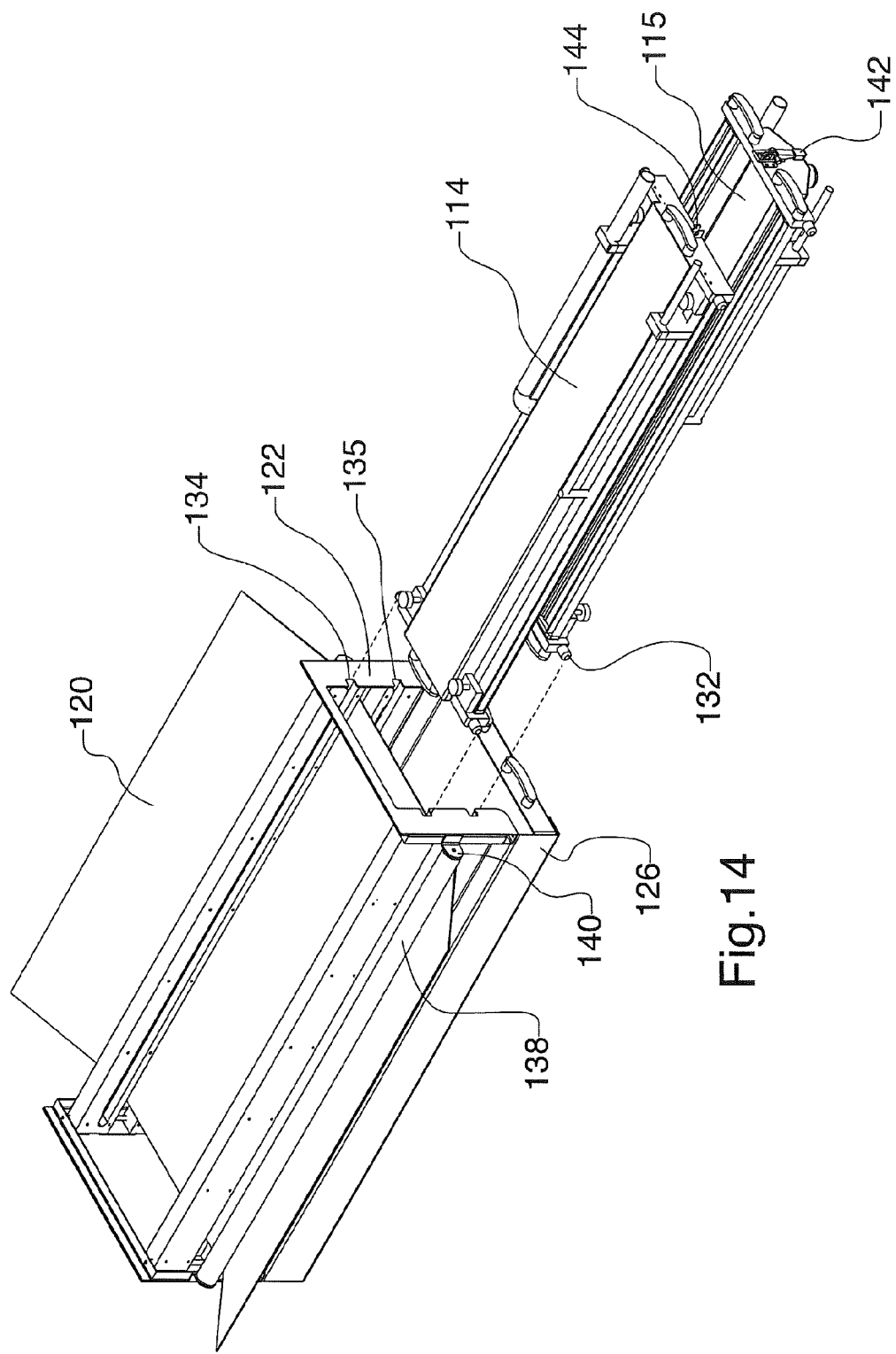
FIG. 14 is a perspective end view of the conveyor of FIG. 11 illustrating selective removal of some of the components.

The cleaning units 114 and 115 can be moved into and out of a cleaning position in a similar manner to the cleaning unit 14, but in this instance the upper cleaning unit 114 is moved downwardly to a cleaning position, whilst the lower cleaning unit 115 is moved upwardly. When not in a cleaning position the cleaning units 114, 115 can be slid out of the frame 112 in a similar manner as is illustrated in FIG. 14. This again means that one or both cleaning units 114, 115 can readily be cleaned remote from the rest of the apparatus 110.

A number of other modifications may be made without departing from the scope of the invention. For instance in some applications it may be required for the apparatus to clean the underside of the conveyor. In such an instance the apparatus will essentially be turned through 180° such that the cleaning unit acts downwardly rather than upwardly. It may be that an agitator is required to facilitate cleaning of the conveyor, and such an agitator can readily be located in the cleaning unit chamber. An agitator could be in the form of a rotating brush or otherwise.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. Cleaning apparatus, the apparatus including a frame, which frame includes end parts each mountable in a position adjacent a respective side edge of a conveyor to be cleaned, a cleaning unit selectively locatable to extend between the end parts to clean the conveyor, the cleaning unit being selectively movable when extending between the two end parts, between a rest position clear of the conveyor, and an in use position engaging with the conveyor, the frame also including a cross part extending between the end parts, wherein the cross part includes a pair of transverse guides, with which guides side edges of the cleaning unit are slidably engageable when moving to or from a position extending between the end parts.

2. Apparatus according to claim 1, in which the transverse guides are selectively movable relative to the end parts to move the cleaning unit between the rest and in use positions, and the transverse guides are slidably mounted to the end parts.

3. Apparatus according to claim 1, in which link members extendible between ends of the cleaning unit and the end parts can be used to move the cleaning unit to the in use position from the rest position, and the link members have an over centre lock, and the link members are in the form of toggle clips.

4. Apparatus according to claim 1, in which actuators are provided for moving the cleaning unit to the in use position, from the rest position, and the actuators are pneumatically or hydraulically actuated.

5. Apparatus according to claim 1, in which a lip is provided at one end of the transverse guides, over which lip the cleaning unit is movable when moving into or out of a position extending between the end parts, and behind which lip the cleaning unit may be retained when extending between the end parts.

6. Apparatus according to claim 1, in which a collection tray is provided selectively locatable extending between the end parts, and on an opposite side of the cleaning unit to a conveyor to be cleaned, the cross part of the frame includes guides for the collection tray, and the collection tray is slidably movable along the guides when moving into or out of a position extending between the end parts.

7. Apparatus according to claim 1, in which the apparatus includes an urging arrangement engageable with the conveyor to be cleaned, and on an opposite side thereof to the cleaning unit such that when the cleaning unit is in an in use position the conveyor will be urged against the cleaning unit, and the urging arrangement is selectively extendible between the end parts, to permit a conveyor to be located extending between the urging arrangement and the cleaning unit by selectively removing the urging arrangement from extending between the end parts, the urging arrangement including one or more freely rotatable rollers.

8. Apparatus according to claim 7, in which the urging arrangement includes a support member with a planar face engageable with a conveyor opposite the cleaning unit, and with a freely rotatable roller on either side thereof.

9. Apparatus according to claim 1, in which the cleaning unit includes front and rear edge parts relative to movement of a conveyor, engageable with the conveyor, with a body defining a chamber between the edge parts, the rear edge part including an inlet for receiving material cleaned off a conveyor, with the apparatus selectively connectable to a source of reduced pressure to connect to the inlet.

10. Apparatus according to claim 9, in which an elongate seal is provided extending along the rear edge part behind the inlet.

11. Apparatus according to claim 10, in which a second elongate seal is provided extending along the rear edge in front of the inlet, and in which openings are provided through the second elongate seal to accelerate material passing thereby towards the inlet.

12. Apparatus according to claim 9, in which the front edge part includes an outlet for a cleaning fluid to pass therethrough, and the outlet extends across a substantial part of the length of the front edge part, and the apparatus is selectively connectable to a source of cleaning fluid to pass out through the outlet, and the cleaning fluid includes water or steam.

13. Apparatus according to claim 12, in which an elongate seal is provided on the front edge part in front of the outlet, the elongate seal is flexible, and is formed of strips of plastics material such as polyurethane or silicone.

14. Apparatus according to claim 9, in which an agitator engageable against a conveyor is located in the chamber, the agitator is in the form of a brush, and the brush is rotatable.

15. Apparatus according to claim 1, in which the apparatus is mountable to a conveyor assembly so as to engage with the conveyor on the return path.

16. Apparatus according to claim 1, in which the apparatus includes a pair of cleaning units, each engageable respectively with an opposite side of a conveyor to the other, and a respective cross part is provided for each cleaning unit.

17. Apparatus according to claim 16, in which link members extendable between the cleaning units to urge the cleaning units together into respective in use positions, are provided, the link members have an over centre lock, and the link members are in the form of toggle clips.

18. A conveyor assembly including a cleaning apparatus according to claim 1, the apparatus being mounted on the return path of the conveyor.

* * * * *